3,384,162
WATER OR AIR COOLED HEAT EXCHANGER FOR X-RAY GENERATING APPARATUS

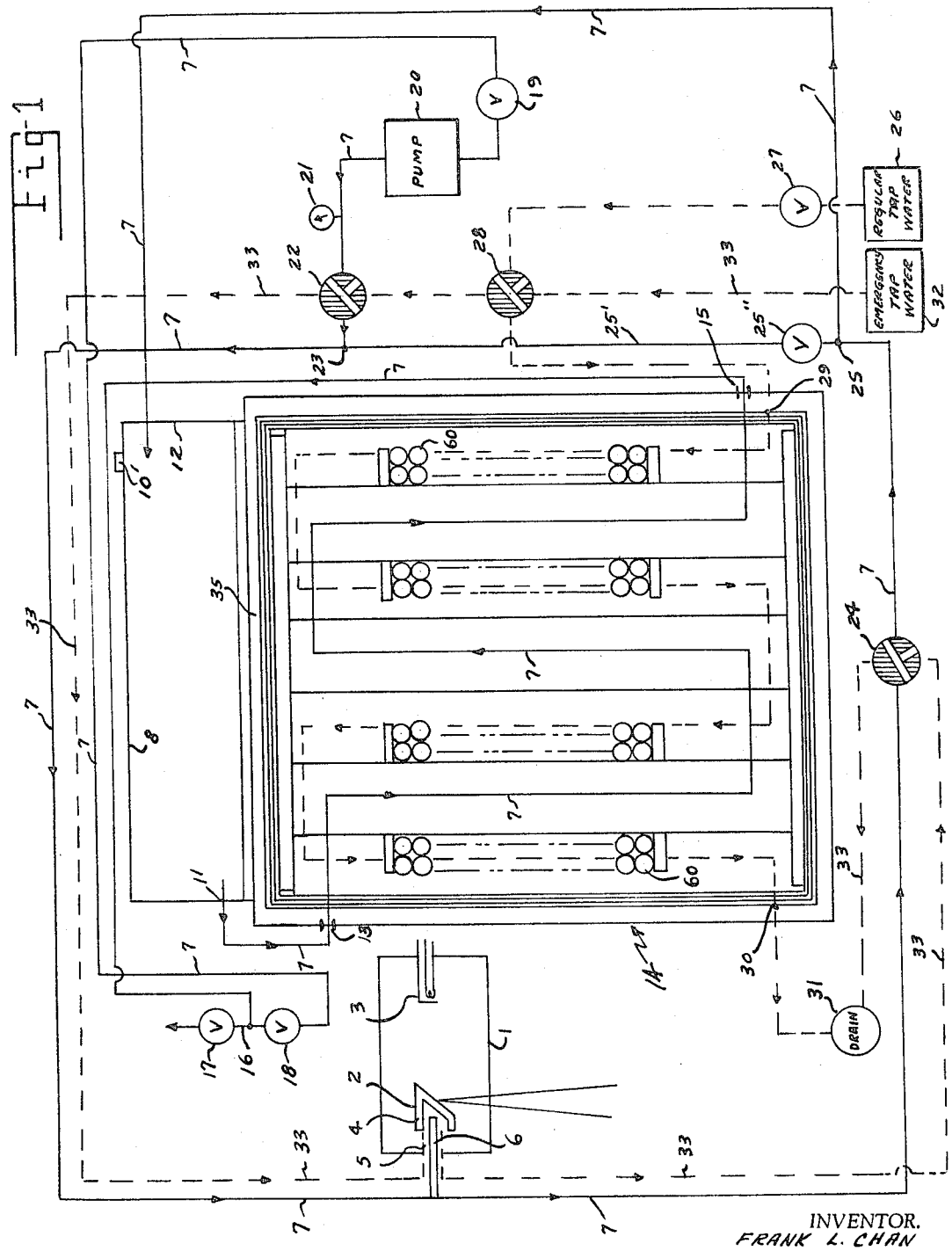
INVENTOR.
FRANK L. CHAN

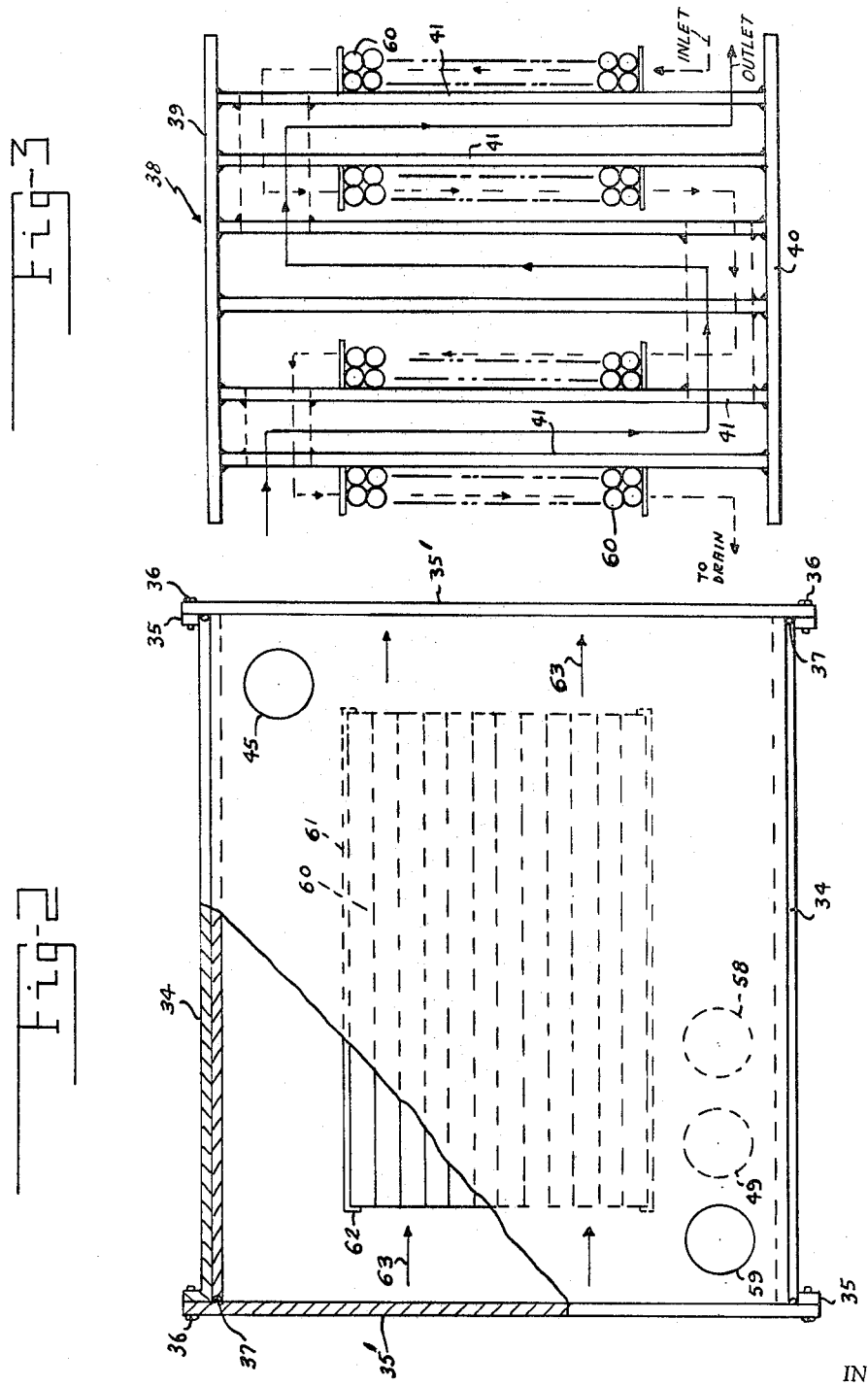

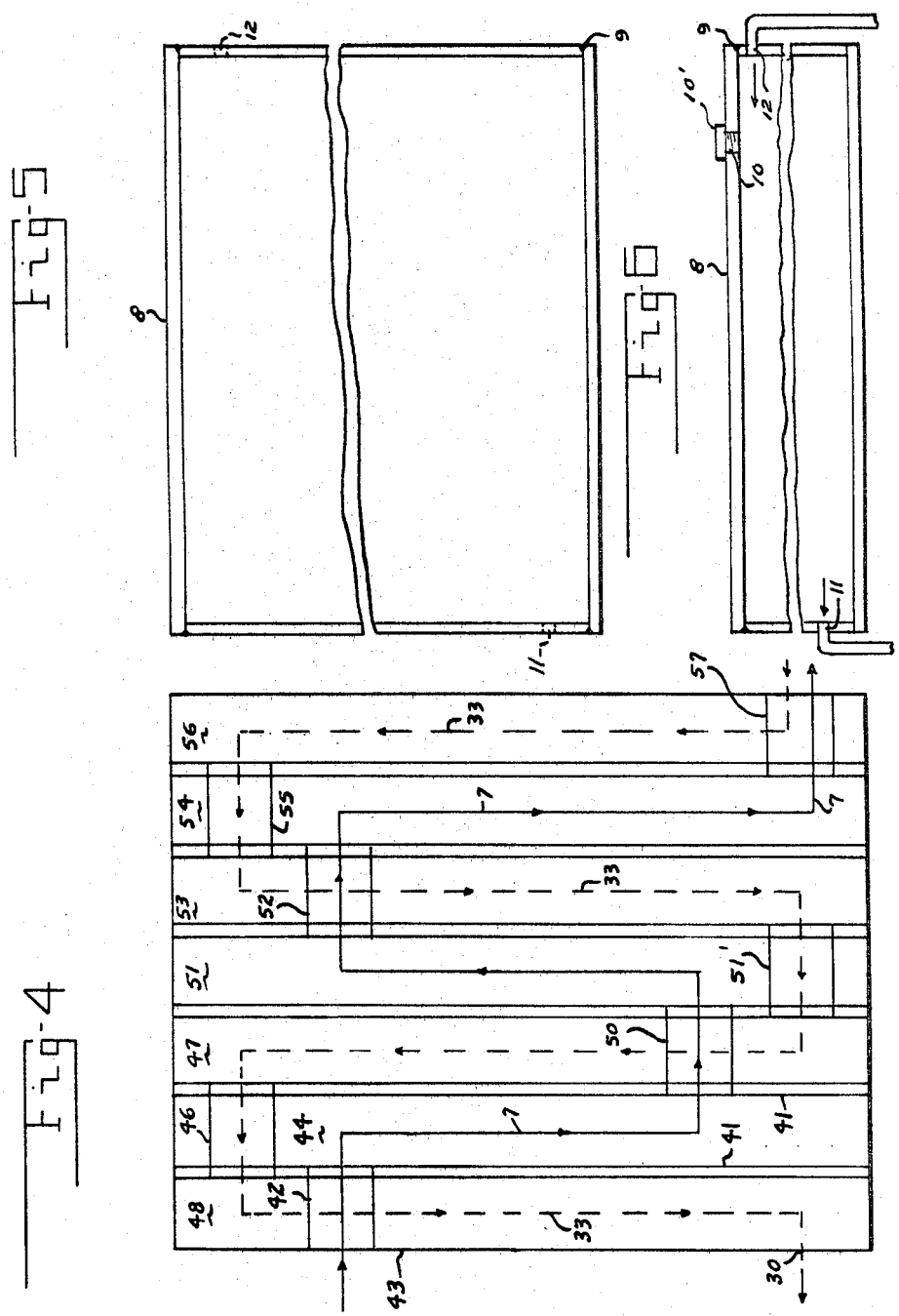

Frank L. Chan, 3228 Ravenwood,
Fairborn, Ohio 45324
Filed Aug. 12, 1966, Ser. No. 572,162
3 Claims. (Cl. 165—107)

ABSTRACT OF THE DISCLOSURE

The invention employs distilled water for cooling the anode of an X-ray tube. The distilled water is conveyed under pressure in a closed pipe system which includes an improved heat exchanger. The distilled water is maintained cool by the use of tap water. The heat exchanger is of rectangular shape having a number of partitions to form compartments which are physically separate except for interconnecting pipes between alternate compartments. The distilled water is caused, due to the position of these pipes, to flow serially through alternate compartments in one direction and the tap water is caused to flow serially through the remaining compartments in the opposite direction in order to increase the transference of heat. The tap water compartments are also provided with an array of parallelly positioned open-ended pipes through which cool air from a fan can be blown in the event that the tap water fails.

---

The invention described herein may be manufactured and used by or for the Government for governmental purposes without the payment to me of any royalty thereon.

The present invention relates to X-ray apparatus which is constructed for sustained and powerful output of X-rays for therapeutic, diagnostic, X-ray diffraction, absorption or fluorescence processes.

X-ray tubes, when used continuously over long periods of time, for example, in the examination of crystal structure or X-ray fluorescence, become quite hot, particularly at the target. The latter is bombarded with high velocity electrons, concentrated on a small area which is preferably stationary in order that the X-rays given off will be of a constant qualitative character.

Even when high refractory buttons are used at the point of electron impact, the sustained heating effect may cause pitting or other signs of localized melting. It has been proposed to prevent, or at least to reduce, this localized heating effect by extending a large anode stem through the envelope and provide a ribbed heat radiator on the exterior part of the stem. Hollow anodes or targets have also been employed to which mineral oil and tap water are applied.

It has been found that the exterior heat radiator is not altogether adequate to dissipate the tremendous power that is being sent through the tube. Mineral oil is rather hard to handle and is peculiar in that it lends itself readily to seepage. Tap water, while easier to effect a tight seal, nevertheless contains impurities, insoluble solids and mineral matter, the character and amount of which depend upon the locality. These impurities are precipitated from the heated water and, in time, become deposited at the back of the button or other active surface to form a solid crust which reduces the transfer of heat from the target to the cooling medium.

Again, when employing X-ray tubes in laboratories for investigational work that may extend continuously for long periods of time, it is essential that some form of cooling effect be always present, for the slightest discontinuity is apt to severely damage the tube. Any cooling system that can be devised is obviously subject to occasional shutdown due to an emergency, particularly, when the tube is being used on an eight-hour day-to-day basis so that a standby system, even though inefficient, would normally have to be provided.

Again, an X-ray tube in modern practice forms part of a larger structure which includes a transformer and rectifier, in case the original source of energy is alternating current, and for convenience, the entire assembly will be termed "An X-ray Generator." The transformer-rectifier and other conventional apparatus would be used for supplying the X-ray tube with current at the proper voltage and would also become heated when the tube is being used over sustained periods of time.

An object of the invention is to provide an improved cooling system for an X-ray generator, including not only the X-ray tube, but also the apparatus structurally and electrically associated with the tube.

A more particular object is to provide a cooling system for an anode or target of an X-ray tube.

Another object is to provide a cooling system which maintains the cooling ducts and surfaces free from contamination particles and renders itself readily and structurally to both nonseepage and nonleakage.

Still another object is to provide an improved cooling system which can be used both for an X-ray tube and for associated apparatus such as transformers, rectifiers, etc., which operate continuously over long periods of time and which need not rely on any questionable source of water for cooling.

These objects are attained in brief by employing a structure and system by which distilled water, as distinguished from tap water, can be effectively used as a coolant of the target or the tube; also for other parts of an X-ray generator which require cooling, and in which the minimum amount of expensive distilled water is employed by circulating the same in a closed system which is cooled by an inexpensive cooling medium such as tap water without one type of water coming into contact with the other type.

The improved cooling system is also devised in such manner that under emergency conditions, and on a temporary basis, other forms of coolant can be used without any major change in the system.

As to the need of allowing my improved system to be used under emergency conditions, it will be understood that in laboratories doing certain kinds of work, for example, X-ray fluorescence or X-ray difraction of crystals, it is necessary to run the X-ray tube apparatus for long periods of time and with absolutely no interruption. On occasion, the source of cooling medium might fail and unless some improvisation is immediately effected, the tube would fail and possibly its associated apparatus on which it depends for energization. These laboratories are often located in places where little or no consideration has been given to the character and adequate availability of the tap or spring water, also the possibility of an outage which would require a standby cooling system in order that the experiments or treatments in progress might continue.

Accordingly, I have devised a system which takes care of the situations mentioned to the end that not only the cooling surfaces of the anode and any other vital part of the X-ray generator are always maintained at a safe operating temperature regardless of the length of continuous use by the system as a whole has built within it an emergency structure which prevents failure due to the sudden nonavailability of suitable water.

The improved cooling apparatus is comprised essentially of two main structures, apart from the accessories, although, as will be pointed out hereinafter, the structures can also be used in connection with those accessories which pertain to the supply of current and voltage during operation. The two structures are constituted of: (1) a source of distilled water which is continuously being circulated, and (2) an improved heat exchanger. The distilled water is continuously being cooled by tap water and the latter is not allowed to come into contact with the active parts to be cooled except under emergency conditions.

The invention will be better understood when reference is made to the following description and accompanying drawings, in which:

FIG. 1 represents, in diagram, a plan view of the heat exchanger structure together with the exterior piping, valves, etc. and a source of distilled water, all improved in accordance with my invention;

FIG. 2 depicts a plan view, partly broken away and in section, of the improved heat exchanger with all the interior parts in place;

FIG. 3 is a side or elevational view of an interior unit which contains the various parts of the cooling structure and which sets snugly within the casing of FIG. 2;

FIG. 4 represents in plan, but diagrammatic in form, the interior unit shown in FIG. 3 as positioned within the outside casing. This figure shows the relative positions of the intercompartment pipes but omits certain parts of the cooling structure for clearness; and FIGS. 5 and 6 are plan and elevation fragmentary views of the distilled water tank that is placed on top of the heat exchanger structure.

In the various figures, the application of the invention, specifically to an X-ray tube, apart from its operating accessories, such as the transformer and rectifier is shown, but it will be understood that the improved circulating coolant can be readily applied through water jackets or any other suitable manner to the operating accessories.

Referring to FIG. 1, reference character 1 designates a typical X-ray tube having an anode or target 2 and an indirectly heated cathode 3.

The anode is hollow, as indicated at 4, and is supported on a hollow tube, diagrammatically indicated at 5, which communicates with the anode interior. A conduit 6 projects into the tube 5. The purpose of the tube and conduit is to present and circulate a coolant, described hereinafter, through the target to the end that the cooling surfaces of the anode are maintained at a safe operating temperature regardless of the length of continuous use and is not subjected to deposits of any kind, even when the tube is being operated on a sustained basis under maximum X-ray output.

As stated hereinbefore, the actual coolant that comes into contact with the anode or target of the tube is conconstituted of distilled water in a closed circulator system, the path taken by the water during operation being indicated in FIG. 1 by a light full line 7 which has its inception or source in a distilled water tank designated 8. The tank as shown in FIGS. 5 and 6 is constituted of a completely inclosed box or compartment, preferably made of brass, and the sides, top and bottom portions are brazed or soldered as indicated at 9. The box is of substantial thickness and contains three openings, one at the top, 10, with a screw plug 10' (FIG. 6) for receiving distilled water, and an outlet 11 and an inlet 12. The tank 8 is conveniently positioned on top of an improved heat exchanger, which will be described presently, but spaced therefrom in any suitable manner so as not to absorb any heat from the exchanger. The flow direction of the distilled water into and through the heat exchanger is shown diagrammatically in FIG. 1 by the arrows applied to the line 7. It will be understood that the line 7 actually is constituted of pipes or conduits suitably joined together.

The distilled water leaving the tank 8 passes through an inlet 13 of the heat exchanger, indicated generally at 14, the purpose of which is to remove the excess heat from the circulating distilled water. The same light, full line 7 has been applied to the entire circulating system of the distilled water for clearness.

After passing through the heat exchanger, the distilled water leaves the heat exchanger at the outlet 15 and continues by suitable conduit 7 upwardly, then horizontally to a junction point 16. The water at this point can either pass through a valve 17 to drain or through another valve 18 where it continues its passage through the line 7 to a third valve 19 and through a pump 20 of any suitable and well-known type. From the outlet of the pump, the water continues through the line 7 containing a pressure gauge 21 to a three-way valve 22. Assuming that the opening in this valve is horizontal, the distilled water line continues to a junction point 23 and passes upwardly and across the top of the figure and then down at the extreme left so as to enter the inner tube 6 which projects into the hollow anode or target 2 of the X-ray tube.

After cooling the target, the distilled water line 7 continues downwardly at the left-hand end of the figure to a three-way valve 24 and assuming that the latter has its passageway turned to the horizontal direction, the water continues to a junction point 25. From that point, the line continues as indicated at the lower right-hand corner of the drawing and then vertically upward and then along the horizontal pipe where it enters the upper or inlet opening of the compartment 8.

A bypass path 25' may be established between the junction points 23 and 25 controlled by a valve 25". This path for distilled water can be employed in case it is desired to send a smaller proportion of the distilled water to the tank 8. Thus, the path acts as a temporary bypass, when and if desired.

There is thus shown and described a closed path for the distilled water leaving the compartment 8, then flowing through the improved heat exchanger and thence through the pump 20 and controlled by suitable valves, finally reaching the anode 2 of the X-ray tube, back to the original source of the water contained in the tank 8. This path is shown for clearness by a light, full line so as to distinguish the same from a path taken by tap water which is employed for cooling the distilled water and which tap water in indicated in the figure by a dotted line.

The tap water has its source 26 at the city mains or well water under pressure and passes first through a valve 27 and upwardly to a three-way valve 28. Assuming that the passageway in the last-mentioned valve is horizontal, the tap water will enter the improved heat exchanger at the point marked 29, the tap water inlet being separate and apart from the distilled water outlet as will be explained hereinafter. The tap water will then pass through a circuitous path in the improved heat exchanger as will be described in detail and finally leaves the latter at an outlet point marked 30 where it passes as indicated by the arrows to a drain 31. The sole purpose of this tap or well water is to cool the distilled water within the heat exchanger and it will be particularly noted that the tap water never comes into contact with the distilled water even though it efficiently removes the heat from the latter whose temperature had been raised by the heat of the anode 2 and rectifier. The tap water is driven through its various conduits and the heat exchanger by the pressure that normally accompanies water of this character.

Accordingly, only the distilled water enters the interior of the anode 2 of the X-ray tube and this is most advantageous because if tap water were used for cooling the anode, the latter in most localities holds solid material, salts, magnesia, lime, etc., in proportion of possibly 400 parts in one million parts. These substances are apt to be precipitated within the hollow anode and rectifier, particularly when the water is at an elevated temperature and the tube is being run on an eight-hour day period, five days a week, as in highly critical laboratory work, so that after a period of time the interior of the anode becomes coated with this solid precipitate. The latter prevents a ready transference of heat from the anode to the coolant and, in time, would cause a complete breakdown of the tube as well as in the meantime alter the operating characteristics, i.e., the exact focus of the rays and perhaps their intensity. On the other hand, the distilled water contains no potential precipitate and, since it is in a closed path subject only to the cooling effects of tap water, the interior surface of the anode is completely devoid of such matter and will readily transfer its heat to the moving coolant.

However, under emergency conditions, as when experiments within the laboratory must continue and, for any reason whatsoever, the distilled water path becomes inoperative, possibly by a failure of the pump, I provide an auxiliary path through the anode of the tube for use by an emergency tap water source. This source is indicated at 32 and passes up through a line 33 to the three-way valve 28. Assuming that the passageway in this valve is directed vertically, the emergency tap water proceeds to the three-way valve 22 which, when turned, would have its passageway extended vertically and flow along the upper edge of the figure as indicated and thence down as shown at the left-hand end of the figure into the conduit 5 at the back of the anode and then continues downwardly at the left-hand of the figure to the three-way valve 24. When the latter is turned so that the passageway is vertical, this emergency tap water will flow to the drain 31. It will be noted in this particular case that the emergency tap water does not flow through the heat exchanger since it has been assumed that the distilled water path is for any reason whatsoever closed or inoperative. Consequently, the experiments that might have been started over a long period of time and using the distilled water, regular tap water sources, can still continue over a short period of time by employing the emergency tap water source, although it will be understood that the emergency source is definitely not recommended for extended periods of time on account of the potential precipitate situation. However, the re-establishment of the flow of distilled water under the pressure of pump 20 will tend to cleanse the interior surface of the anode if the precipitate has not been allowed to continue for any considerable time.

It is also apparent that the three-way valves 22, 24 and 28 provide any desired path for the tap water to take so that the heat exchanger can cut in or cut out as may be desired or necessary in maintaining the anode of the X-ray tube at a temperature as will not permit any pitting or burnout of the target area that might entail the failure of the entire tube. It will be noted that in the fluid flow diagram shown in FIG. 1, the paths have been indicated by single lines but which would normally be constituted of standard piping and any crossing over by the paths or piping has been indicated for clearness by small loops. In the event that no tap water cooling of the distilled water can be carried out, I may obtain substantial cooling effect, on a temporary basis only, by forcing cool air under pressure through the heat exchanger as will be described presently.

*Heat exchanger*

The details of the heat exchanger are shown more clearly in FIGS. 2, 3, and 4. Referring to these figures, the exchanger structure is constituted of a large casing or box having four closed sides 34, open at both ends and terminating in a narrow flange or lip 35 at each end. This box member is preferably made of brass of substantial thickness and the sides can be brazed together in any suitable and well-known manner to render the same watertight. The ends of the structure are closed by covers 35' (FIG. 2) having openings around the outer edges which correspond with similar openings provided in the flanges 35 to receive a number of bolts 36. An O-ring seal 37 may be provided between the edges of the square casing 34 and the abutting inner surface of the cover so that the structure constitutes a liquid-tight enclosure but in which the covers 35 can be readily applied or removed for purposes which will be described presently. Within the casing there is a frame member designated generally at 38 (FIG. 3) which fits snugly within the casing and is formed of an upper plate 39 (FIG. 3) and a lower plate 40 preferably made of brass and of substantial thickness. There are a number of partitions or wall members 41 extending between the plates 39 and 40, also made of brass and brazed or otherwise secured to the plates 39, 40. It will be understood that the plates 39 and 40 have a length as will snugly fit widthwise of the casing 34 and the plates extend in a direction normal to the plane of the drawing of FIG. 3 over a length as will fit snugly between the inner surfaces of the cover members 35'. Thus the structure is tightly held within the casing and, yet, slidable in and out of the casing when necessary by removing one of the covers 35'. The wall partitions 41, of which there are six, actually form seven compartments separated from one another because the compartments at each end are completed by the inner walls of the casing 34. However, there are a number of round, short pieces of metal tubing extending between these various compartments. They are so located as a study of the elevational view of FIG. 3 and the plan view of FIG. 4 will show, that circuitous paths, as indicated by the light, full lines (distilled water) and the dotted lines (tap water) are established. Thus, as shown more clearly in FIG. 4, a short piece of pipe 24 extends from the line 43 indicating the inner surface of the casing 34 to the second compartment 44 of the partition array. This pipe is provided for the entrance of the distilled water through the opening 45 (FIG. 2) provided in the side of the casing which corresponds with the inlet diagrammatically indicated at 13 in FIG. 1.

There is also a pipe or conduit 46 extending between the first compartment and the third compartment 47 for carrying tap water from this third compartment 47 to the first compartment 48 and thence out at the opening 49 shown in FIG. 2 and diagrammatically indicated as the outlet point 30 in FIG. 1. A pipe 50 extends between the compartment 44 and the compartment 51 for carrying the distilled water from one compartment to the other as seen more clearly in FIG. 4. Still another short pipe 51' extends between the compartments 47 and 53 for carying tap water from compartment 53 to compartment 47. A short piece of pipe 52 also extends from the compartment 51 across the compartment 53 to the compartment 54 for carrying the distilled water between the compartments 51 and 54. Similarly, a short pipe or conduit 55 extends between the compartment 53, across the compartment 54, to the compartment 56 which, in part, is formed by the inner surface of the casing 34. This pipe 55 is for the purpose of carrying the tap water through the compartment 54 from the compartment 56 to the compartment 53 as can be seen by the dotted line 33. There is a pipe 57 extending from the compartment 54 through the compartment 56 to a distilled water outlet indicated at 58 in FIG. 2, thus following the flow line nomenclature, i.e., light, full line 7. There is a tap water outlet indicated at 59 in FIG. 2. These outlets constitute openings in the casing 34 to which a suitable form of fluid coupling (not shown) can be connected.

Thus, to summarize with respect to the flow of both the distilled water and the tap water through the heat exchanger, it will be noted that the tap water enters the heat exchanger at the point diagrammatically indicated at 29 (FIG. 1) through the openings 49 (FIG. 2) in the casing and proceeds diagonally across the compartment 56 (FIG. 4) then through the pipe 55 to the compartment 53 and downwardly diagonally through the pipe 51' to compartment 47 and then diagonally across the compartment and through pipe 46 to compartment 48, leaving the heat exchanger at the point 30 which corresponds to the opening 59 in the casing (FIG. 2). On the other hand, the distilled water enters the opening 45 (through a suitable designed coupling, FIG. 2) thence through the pipe 42 to the compartment 44, then diagonally across the compartment to the pipe 50 into the compartment 51, thence diagonally across this compartment and through the pipe 52 to the compartment 54 and then through the pipe 57 to the outlet opening 58 in the casing 34 (FIG. 2). Therefore, the various columns of distilled water in compartments 44, 51, 54 are sandwiched by means of the partitions 41 between the columns of tap water flowing through the compartments 56, 53, 47 and 48. Inasmuch as the temperature of the tap water is many degrees less than the temperature of the heated distilled water that is passing through the heat exchanger on its way to and from the anode of the X-ray tube, the distilled water gives up its heat to the moving tap water as the latter flows through the exchanger to the drain 31. It will be noted that the partitions 41 completely separate the tap water from the distilled water because the two types of water are kept in isolation from one another, not only by reason of the leak-proof joints between the partitions 41 and the plates 39, 40, but also by the presence of the respective pipes 42, 46, 50, 51', 52, 55 and 57. It is therefore clear that a considerable cooling effect is provided in the heat exchanger and this cooling effect maintains the distilled water that is presented to the interior of the anode at a temperature low enough to prevent any pitting or burnout of the metal due to electron bombardment. Repeated or continuous use of the tube has no effect from the standpoint of precipitation of solid material since the distilled water is completely free from such material.

It will be noted in FIG. 4, that the distilled water and tap water in passing through the heat exchanger travel in opposite directions. This counter-flow arrangement is desirable in effecting the maximum transfer of heat from one medium to the other. Moreover, the temperature of tap water is lowest at the point 15 where the distilled water leaves the heat exchanger to provide the maximum cooling effect at this point. This is advantageous since the coldest portion of the distilled water is presented directly to the target of the X-ray tube.

I have also disclosed a continuously operating system in which an emergency tap water source 32 can be used for cooling the anode, in which case the tap water is not sent through the heat exchanger but is applied directly to the anode of the tube and from there flows to the drain 31 when the valves 22, 24 and 28 are in proper position. This will insure continuous use of the X-ray tube. When the distilled water again becomes available and the tube is used for an extended period of time, the moving water under pressure might serve to dislodge any loose particles which may have precipitated during the time that the emergency tap water was being used.

The improved heat exchanger also lends itself to an air cooling effect in the event that both the regular tap water source and the emergency tap water source are not available. This additional insurance against failure of the system uses air rather than water for cooling the anode and is brought about by a series of copper or brass tubes shown more specifically in FIGS. 2 and 3. These tubes, of which 96 have been illustrated in groups of 24 each, may be formed of brass or copper and extend for possibly three-quarters of the length of the heat exchanger (FIG. 2). They can be ½" in diameter and are arranged in two rows of twelve each, secured together by spot welding and suspended between a pair of long brackets 61 which are secured to the partitions 41 so as to project into the compartments 47, 48, 53 and 56 through which tap water is normally circulated. However, it will be understood that these tubes perform no cooling function as far as the circulation of the tap water is concerned. The brackets 61 have overhanging lips 62 and these lips can be conveniently secured to each bracket by means of screws (not shown).

In the event that sources of tap water are not available, it may be desirable to cool the distilled water passing through the heat exchanger by a draft of air, the latter passing through the various tubes 60 and will to some extent serve to cool the compartments that are normally cooled by the tap water, thus assisting in maintaining the distilled water at a sufficiently low temperature as will permit the X-ray tube to continue to operate. For this purpose, the end covers 35 can be removed by taking off the bolts 36 and then causing a draft of cool air from a fan (not shown) to pass longitudinally through the tubes 60, as indicated in FIG. 2 by the large arrows marked 63.

The distilled water compartments are obviously completely separate from the compartments that are normally cooled by the tap water but now, on an emergency basis, are being cooled by the air passing through the pipes 60 so that there is no intermingling between the distilled water and the cool air. However, it will be understood that the use of this air, and the use of the emergency tap water, are not the preferred manner of operating the cooling apparatus as a whole but are simply to permit the X-ray tube and its associated apparatus such as, the transformer and the rectifier, to be employed on a continuous, even though somewhat inefficient basis.

While a certain specific embodiment has been described it is obvious that numerous changes may be made without departing from the general principle and scope of the invention.

I claim:

1. Apparatus for cooling an electrical element to which a coolant is applied, said coolant being constituted of distilled water, means including a closed pipe system for presenting the distilled water to the element, means including a heat exchanger and a source of tap water under pressure for cooling said distilled water on its way to the said element, said heat exchanger comprising a tank divided by partitions into a plurality of compartments separate from one another except for pipes which place alternate compartments in communication with one another, means for moving said distilled water through said pipes into and out of the alternate compartments, means for moving said tap water by an open system of pipes through the remaining compartments which are adjacent to the distilled water compartments whereby the distilled water in passing through its respective compartments and subjected to the cooling effects of the adjacent tap water compartments flows through the closed pipe system to cool the electrical element.

2. Apparatus according to claim 1 and in which said tank is of rectangular configuration and the partitions extend across the entire height and width to the tank to form a plurality of compartments, one length of said pipe which brings the distilled water within the cooling effect of the tap water enters the upper end of the tank and extends across the first compartment containing tap water and has an exit at the second compartment containing distilled water, another length of pipe at the lower end of the tank having an entrance at the second compartment and after traversing the third compartment presents an exit at the fourth compartment containing distilled water, another length of pipe at the upper end of the tank and having an entrance at the fourth compartment and after traversing the fifth compartment presents an exit at the sixth compartment, and another length of pipe at the lower end of the tank having an entrance at the sixth compartment and after traversing the seventh compartment containing tap water presents an exit at the exterior of the tank where it connects with the closed piping system whereby the distilled water in flowing through the second, fourth and sixth compartments is caused to move from top to bottom and vice versa of these compartments to reach the pipe entrances and thus receive the optimum cooling effect of the adjacent tap water containing compartments.

3. Apparatus according to claim 1 and in which said tank is of rectangular configuration and the partitions extend across the height and width of the tank to form a plurality of compartments, said open system of pipes for moving the tap water through said remaining alternate compartments of the heat exchanger includes a length of pipe which enters the tank at the lower end and terminates at the first tap water compartment, said length of pipe being positioned near the exit of the distilled water closed pipe system, another length of pipe located near the top of the tank and extending from the first tap water compartment to the second tap water compartment after traversing the distilled water compartment, another length of pipe located near the bottom of the tank and extending from the second tap water compartment to present an exit at the third tap water compartment after traversing the second distilled water compartment, another length of pipe located near the top of the tank and extending from the third tap water compartment to present an exit at the fourth tap water compartment after traversing the third distilled water compartment, and another length of pipe which leaves the tank at the bottom and extends from the fourth tap water compartment to an external drain, whereby the tap water in passing through the first, third and fifth compartments is caused to flow in the opposite direction from the distilled water which passes through the second, fourth and sixth compartments and thus present the optimum cooling effect to the adjacent distilled water compartments.

References Cited
UNITED STATES PATENTS

| | | | |
|---|---|---|---|
| 2,053,142 | 9/1936 | Flindt | 313—12 X |
| 2,484,542 | 10/1949 | Atwood | 165—107 X |
| 2,576,213 | 11/1951 | Chausson | 165—165 |
| 2,673,940 | 3/1954 | Slifkin | 313—23 |
| 2,875,986 | 3/1959 | Holm | 165—165 X |

ROBERT A. O'LEARY, *Primary Examiner.*

A. W. DAVIS, *Assistant Examiner.*